(12) United States Patent
Kim

(10) Patent No.: US 8,451,295 B2
(45) Date of Patent: May 28, 2013

(54) MOBILE TERMINAL AND CONTROLLING METHOD THEREOF

(75) Inventor: Tae Yong Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 440 days.

(21) Appl. No.: 12/533,881

(22) Filed: Jul. 31, 2009

(65) Prior Publication Data

US 2010/0110087 A1     May 6, 2010

(30) Foreign Application Priority Data

Oct. 30, 2008   (KR) .................. 10-2008-0107171

(51) Int. Cl.
| | |
|---|---|
| G09G 5/00 | (2006.01) |
| G09G 5/14 | (2006.01) |
| G06T 15/00 | (2006.01) |
| G06T 1/20 | (2006.01) |

(52) U.S. Cl.
CPC .............. G09G 5/14 (2013.01); G09G 2340/10 (2013.01); G09G 2340/125 (2013.01); G06T 15/005 (2013.01); G06T 1/20 (2013.01)
USPC ........... 345/629; 345/522; 345/698; 715/234; 715/762; 715/763; 455/566; 375/240.02; 375/204.24

(58) Field of Classification Search
CPC . G09G 5/14; G09G 2340/10; G09G 2340/125; G06T 15/005; G06T 1/20
USPC ................. 345/522, 698; 455/566; 715/234, 715/762; 375/240.02–240.24
See application file for complete search history.

(56) References Cited

U.S. PATENT DOCUMENTS

| | | | | |
|---|---|---|---|---|
| 7,606,861 | B2 * | 10/2009 | Killcommons et al. | 709/206 |
| 2004/0139208 | A1 * | 7/2004 | Tuli | 709/230 |
| 2006/0010111 | A1 * | 1/2006 | Jones et al. | 707/3 |
| 2006/0053233 | A1 * | 3/2006 | Lin et al. | 709/247 |
| 2007/0191070 | A1 * | 8/2007 | Rao | 455/566 |
| 2008/0143760 | A1 * | 6/2008 | Ellis et al. | 345/698 |
| 2008/0285565 | A1 * | 11/2008 | Gunther | 370/394 |
| 2009/0002368 | A1 * | 1/2009 | Vitikainen et al. | 345/422 |
| 2009/0006988 | A1 * | 1/2009 | Lu et al. | 715/762 |
| 2009/0225093 | A1 * | 9/2009 | Harper et al. | 345/522 |
| 2009/0225828 | A1 * | 9/2009 | Perlman et al. | 375/240.02 |
| 2009/0225863 | A1 * | 9/2009 | Perlman et al. | 375/240.24 |
| 2009/0228782 | A1 * | 9/2009 | Fraser | 715/234 |
| 2009/0228946 | A1 * | 9/2009 | Perlman et al. | 725/110 |

* cited by examiner

*Primary Examiner* — Jin-Cheng Wang

(74) *Attorney, Agent, or Firm* — Birch, Stewart, Kolasch and Birch, LLP

(57) ABSTRACT

A mobile terminal and controlling method thereof, which are suitable for facilitating a user to use the terminal, are disclosed. The present invention includes providing multimedia relevant data in graphic data to a graphic processing unit, rendering a graphic frame using non-multimedia relevant data in the graphic data and providing the rendered graphic frame to the graphic processing unit, enabling the graphic processing unit to combine the multimedia relevant data and the rendered graphic frame together, and displaying the combined data and frame on a display unit. Accordingly, since a large-scale graphic data is processed in a manner of being appropriately distributed to a controller and a graphic processing unit of a terminal, an execution speed of the terminal can be enhanced.

3 Claims, 13 Drawing Sheets

Multimedia relevant data 1

Multimedia relevant data 2

Multimedia relevant data 3

FIG. 12

```
Public void show (Window parent) {
    JDialog dialog:
    If (parent == null) {
      dialog = new JDialog ();
    } else {
      dialog = new JDialog (parent);
    }
    JLabel backgroundLabel = new javax.swing.JLabel();
    JLabel applicationNameLabel = new javax.swing.JLabel();
    JLabel developerNameLabel = new javax.swing.JLabel();
    JPanel content = new JPanel();
    dialog. setContentPane (content);
    content.setBackgound (new java.awt.Color(90, 9, 6));
    String imageLoc;
    try {
            imageLoc = Application.getResourceAsString("aboutBox.loc");
    } catch (MissingResourceException mre) {
            image Loc = null;
    }
    If (imageLoc == null) {
       imageLoc = "resources/aboutBox-background.jpg";
    }
    backgoundLabel.setIcon (new javax.swing.ImageIcon (
            getClass(). getResource (imageLoc)));

applicationNameLabel.setFont (new java.awt.Font ("Arial", 1, 20));
    applicationNameLabel.setForeground (new java.awt.Color (255, 255, 255));
    applicationNameLabel.setText (Application.getInstance().getName());

developerNameLabel.setFont (new java.awt.Font ("Arial", 0, 14));
    developerNameLabel.setForeground (new java.awt.Color (255, 255, 255));
```

MOBILE TERMINAL AND CONTROLLING METHOD THEREOF

Pursuant to 35 U.S.C. §119(a), this application claims the benefit of earlier filing date and right of priority to Korean Application No. 10-2008-0107171, filed on Oct. 30, 2008, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a user to use the terminal.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, the demand for a terminal provided with a high-resolution display is ongoing to rise. Yet, if the high-resolution display is mounted in the terminal, a graphic data size should inevitably increase to satisfy the high-resolution display, which may overload a controller of the terminal according to a large-scale graphic data processing. This cause a problem that an execution speed of the terminal gets slow down.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which large-scale graphic data for a high-resolution display provided to a terminal can be more quickly processed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit, a wireless communication unit configured to receive graphic data of a website via an internet access, a graphic processing unit configured for graphic processing, and a control unit configured to transfer multimedia relevant data in the graphic data to the graphic processing unit, the control unit configured to render a graphic frame using non-multimedia relevant data in the graphic data, the control unit configured to transfer the rendered graphic frame to the graphic processing unit, wherein the controller controls the graphic processing unit to combine the multimedia relevant data and the rendered graphic frame to display on the display unit.

In another aspect of the present invention, a mobile terminal includes a display unit, a graphic processing unit configured for graphic processing, and a control unit configured to load a prescribed program, the control unit configured to read a command of the program, the control unit controlling the read command to be transferred to the graphic processing unit, wherein the control unit controls the graphic processing unit to execute the command to display a prescribed graphic on the display unit.

In another aspect of the present invention, a method of controlling a mobile terminal includes providing multimedia relevant data in graphic data to a graphic processing unit, rendering a graphic frame using non-multimedia relevant data in the graphic data and providing the rendered graphic frame to the graphic processing unit, enabling the graphic processing unit to combine the multimedia relevant data and the rendered graphic frame together, and displaying the combined data and frame on a display unit.

In a further aspect of the present invention, a method of controlling a mobile terminal includes loading a prescribed program, reading a command of the program, providing the read command to the graphic processing unit, and displaying a prescribed graphic on a display unit by executing the command in the graphic processing unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 is a diagram for an example of a source code of a program programmed by Java based language.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
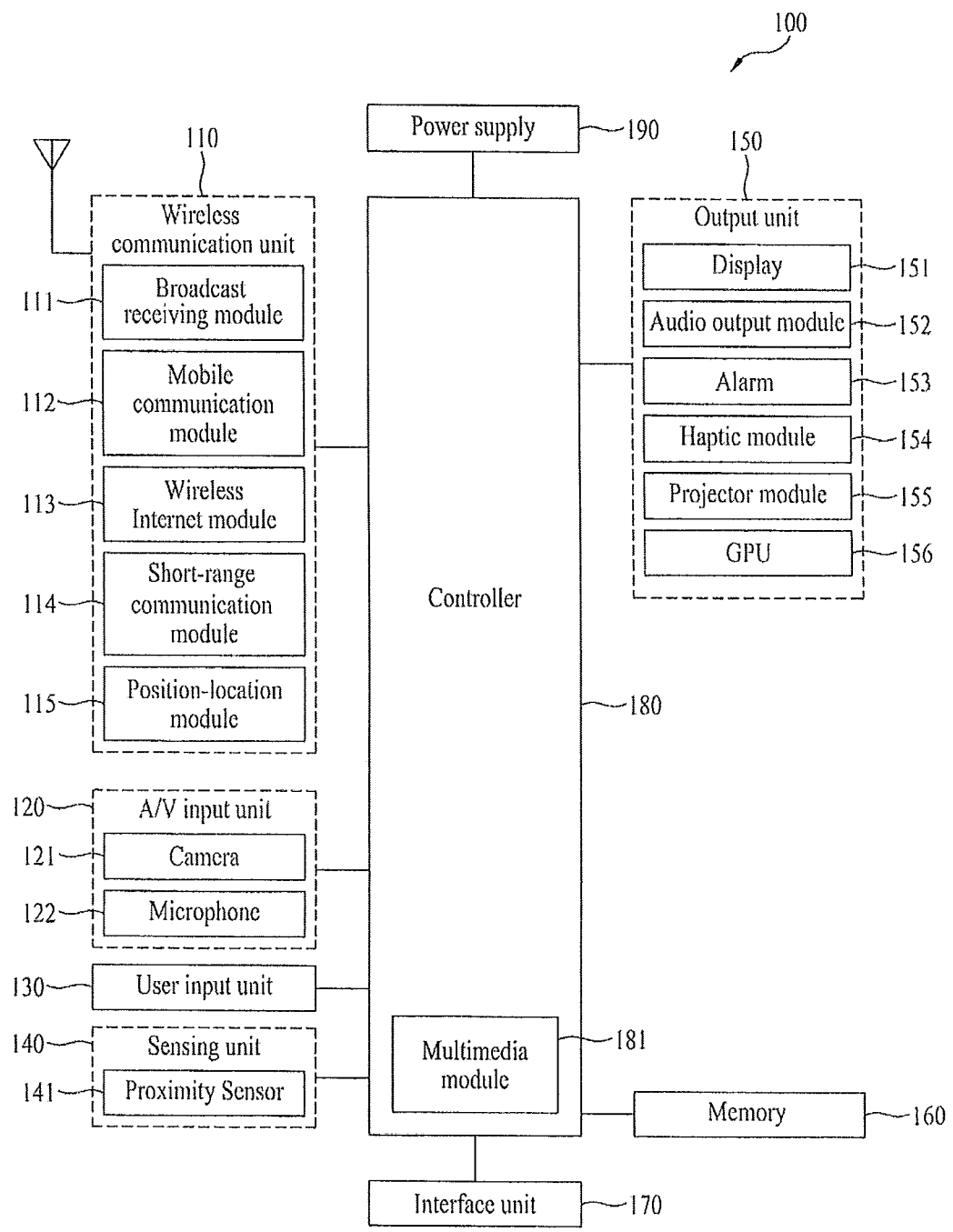
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 in pursuit of simultaneous receptions of at least two broadcast channels or broadcast channel switching facilitation.

Examples of broadcast associated information include information associated with a broadcast channel, a broadcast program, a broadcast service provider, etc. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), DVB-CBMS, OMA-BCAST, integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays can be configured transparent so that an external environment can be seen through the corresponding display. Such a display can be called a transparent display. As a representative example for the transparent display, there is a transparent LCD display or the like.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touchscreen can be configured to detect a touch input pressure as well as a touch input position and size.

Meanwhile, a proximity sensor 141 can be provided within or around the touchscreen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

Example for an operational principle of the proximity sensor is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, the proximity sensor is able to detect the object to detect without interference with the material.

In spite of not providing the proximity sensor, if the touchscreen is electrostatic, it can be configured to detect the proximity of a pointer through an electric field change attributed to the proximity of the pointer.

So, in case that the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. And, a position, at which the proximity touch is made to the touchscreen using the pointer, means a position of the pointer vertically corresponding to the touchscreen when the pointer makes the proximity touch.

If the proximity sensor is used, it is able to sense a proximity touch and its pattern (e.g., proximity touch distance, proximity touch direction, proximity touch speed, proximity touch position, proximity touch moving state, etc.). And, it is also able to output information corresponding to the sensed proximity touch action and the proximity touch pattern to the touchscreen.

The mobile terminal 100 can include a graphic processing unit (GPU) 156 for the processing of the graphic displayed on the display unit 151. If the controller 180 provides the graphic data to the graphic processing unit 156, the graphic processing unit 156 processes the provided graphic data and enables the processed graphic data to be displayed on the display unit 151. This will be explained in detail later.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

The output unit 150 can further include a haptic module 154 and a projector module 155.

The haptic module 154 generates various tactile effects that can be sensed by a user. Vibration is a representative one of the various tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, a recent use history or a cumulative use frequency of each menu in the mobile terminal can be stored in the memory 160.

Moreover, data for various patterns of vibration and/or sound outputted in case of a touch input to the touchscreen can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
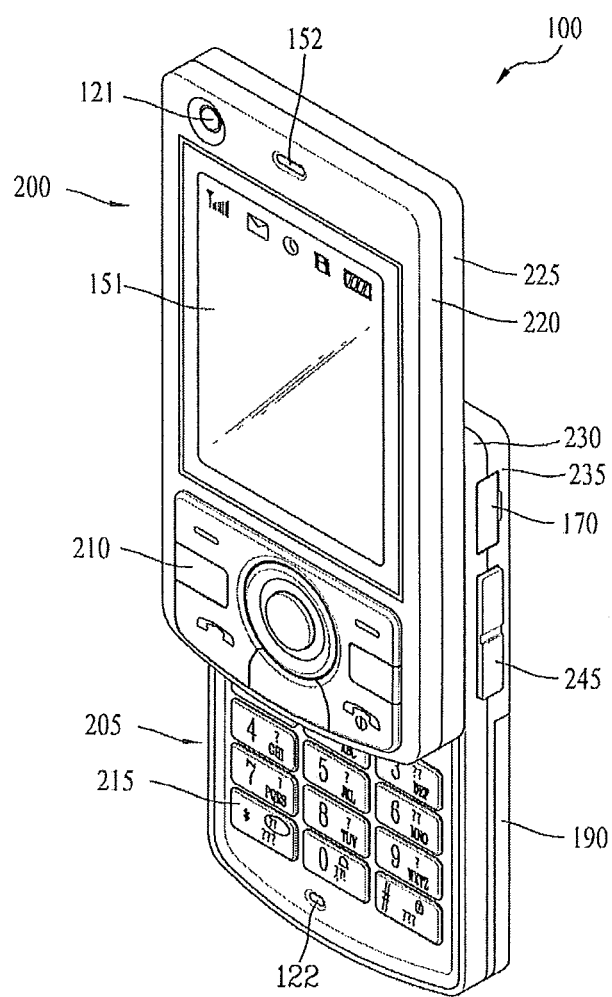
FIG. 2 is a perspective diagram of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 described in FIG. 1 may include a first input unit such as function keys and four directional keys 210 (for example, navigation key), a second input unit such as keypad 215 and a third input unit such as side keys 245. The function keys 210 are associated with the first body 200, and the keypad 215 is associated with the second body 205. The keypad includes various keys such as numbers, characters, and symbols to enable a user to place a call, prepare a text or multimedia message, and otherwise operate the mobile terminal 100.

The first body 200 slides relative to the second body 205 between open and closed positions. Although not shown in drawings, in case of a folder-type mobile terminal, a first body thereof folds and unfolds relative to a second body thereof between open and closed positions. In addition, in case of a swing-type mobile terminal, a first body thereof swings relative to a second body thereof between open and closed positions.

In a closed position, the first body 200 is positioned over the second body 205 in such a manner that the keypad 215 is substantially or completely obscured by the first body 200. In the open position, user access to the keypad 215 is possible. The function keys 210 are conveniently configured for a user to enter commands such as start, stop and scroll.

The mobile terminal 100 is operable in either a standby mode, in which it is able to receive a call or message and to receive and respond to network control signaling or an active call mode. Typically, the mobile terminal 100 functions in the standby mode in the closed position and in an active mode in the open position. This mode configuration may be changed as required or desired.

The first body 200 is shown formed from a first case 220 and a second case 225. The second body 205 is shown formed from a first case 230 and a second case 235. The first case 230 and second case 235 are usually formed from a suitably rigid material, such as injection molded plastic, or formed using metallic material, such as stainless steel (STS) and titanium (Ti).

One or more intermediate cases may be provided between the first case 230 and second case 235 of one or both of the first body 200 and second body 205. The first body 200 and second body 205 are typically sized to receive electronic components necessary to support operation of the mobile terminal 100.

The first body 200 is shown having a camera 121 and audio output unit 152, which is configured as a speaker, positioned relative to the display 151. The camera 121 may be constructed such that it can be selectively positioned relative to first body 200 such as by rotation or, swiveling.

The function keys 210 are positioned adjacent to a lower side of the display 151, which is shown implemented as an LCD or OLED. The display may also be configured as a touch screen having an underlying touchpad which generates signals responsive to user contact with the touchscreen, such as with a finger or stylus.

The second body 205 is shown having a microphone 122 positioned adjacent to the keypad 215 and having side keys 245, which are one type of a user input unit as mentioned above, positioned along the side of second body 205. Preferably, the side keys 245 may be configured as hot keys, such that the side keys are associated with a particular function of the mobile terminal 100. An interface unit 170 is shown positioned adjacent to the side keys 245, and a power supply 190 in a form of a battery is shown located on a lower portion of the second body 205.

Figure 3:
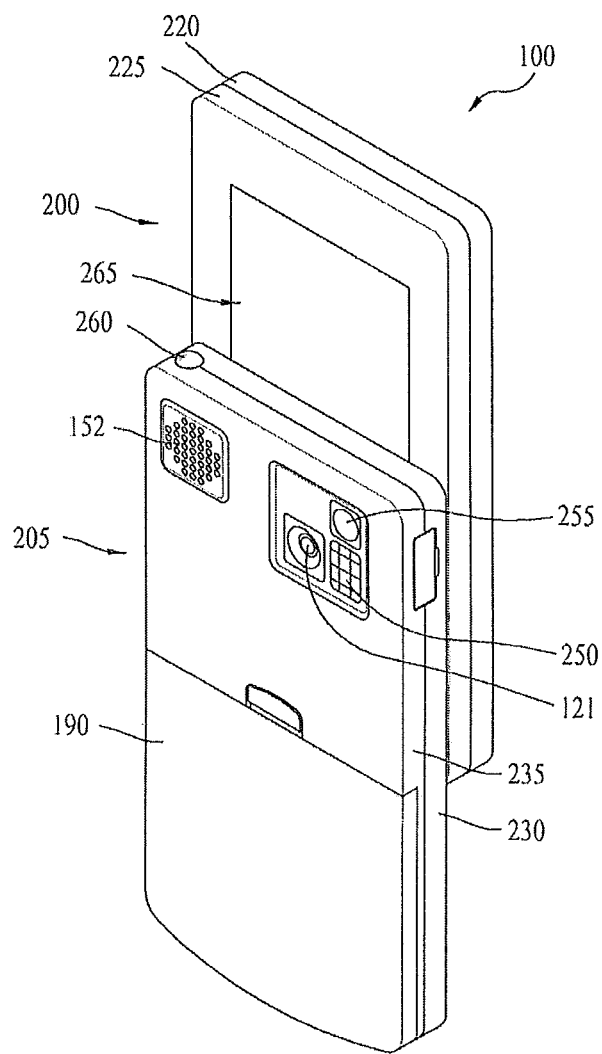
FIG. 3 is a perspective diagram of a backside of the mobile terminal shown in FIG. 2.

FIG. 3 is a rear view of the mobile terminal 100 shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 faces a direction which is opposite to a direction faced by the camera 121 of the first body 200 (FIG. 2). Each of the cameras 121 of the first body 200 and second body 205 may have the same or different capabilities.

In an embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 (FIG. 3) is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205. The antenna 260 functions in cooperation with the broadcast receiving module 111 (FIG. 1). The antenna 260 may be fixed or configured to retract into the second body 205. The rear side of the first body 200 includes a slide module 265, which slidably couples with a corresponding slide module located on the front side of the second body 205.

It is understood that the illustrated arrangement of the various components of the first body 200 and second body 205 may be modified as required or desired. In general, some or all of the components of one body may alternatively be implemented on the other body. In addition, the location and relative positioning of such components are not critical to many embodiments, and therefore, the components may be positioned at locations which differ from those shown by the representative figures.

In the following description, a configuration for providing the aforesaid projector module to the slider type mobile terminal 100 is further explained with reference to FIG. 4A and FIG. 4B.

Figure 4A:
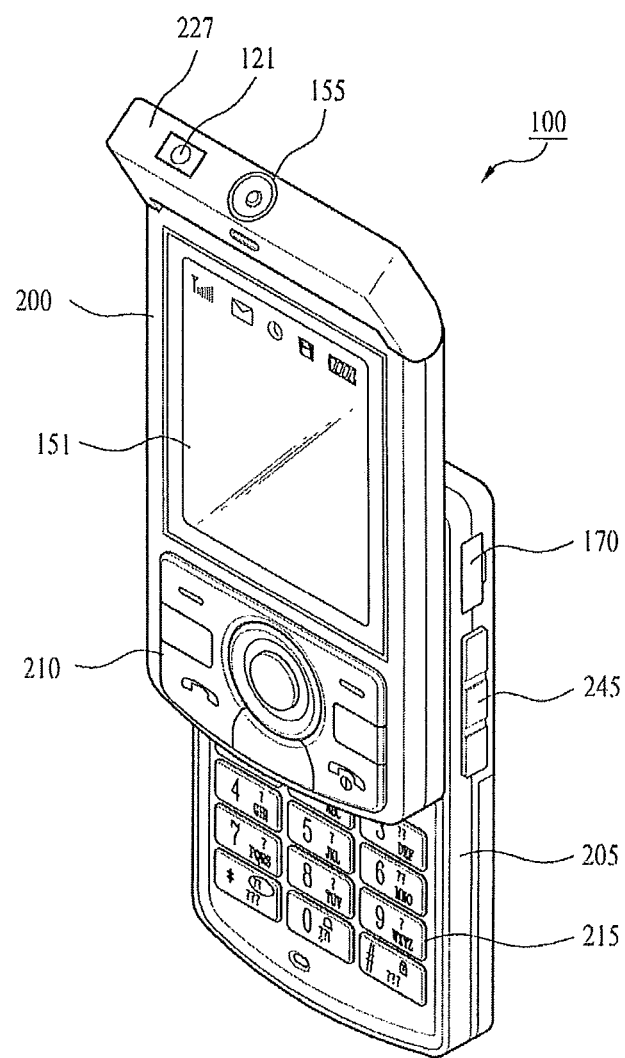
FIG. 4A and FIG. 4B are perspective diagrams for a mobile terminal according to another embodiment of the present invention.
Figure 4B:
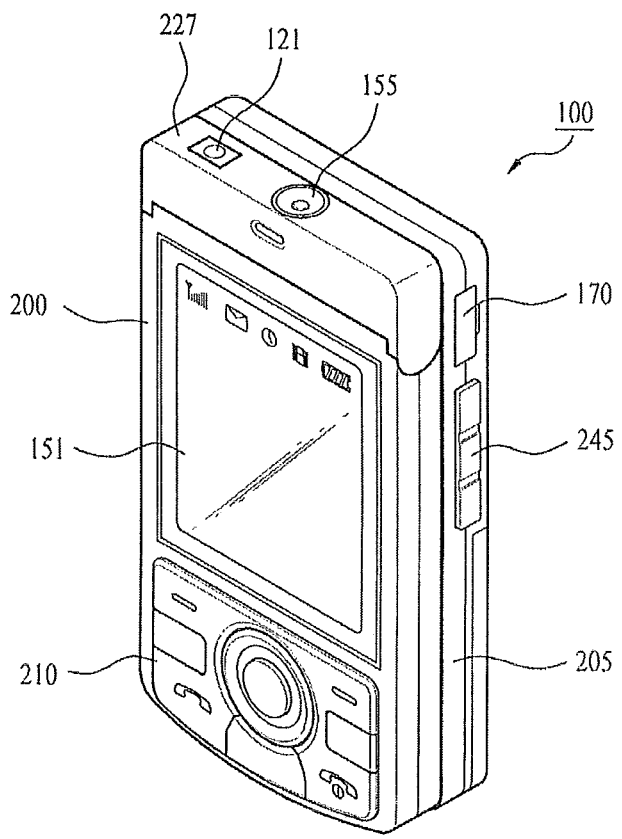

FIG. 4A and FIG. 4B are perspective diagrams of a mobile terminal according to another embodiment of the present invention.

Referring to FIG. 4A and FIG. 4B, In a mobile terminal 100, a projector body 227 having a projector module 155 is rotatably assembled to a first body 200 loaded with a display unit 151. As mentioned in the foregoing description, a second body 205 can be assembled to the first body 200 in a manner of sliding relative to the first body 200.

Referring to FIG. 4A, while the second body 205, which is assembled to the first body 200 to slide relative thereto, is in the open position, the projector body 227 rotatably assembled to the first body 200 is rotated. The projector body 227 can be hinged to the first body 200. And, it is able to adjust a projection angle of the projector body 227 in case of projecting a picture or image using the projector 155 provided to the projector body 227. And, a camera 121 can be provided to the projector body 227 to photograph the image or picture projected by the projector 155.

Referring to FIG. 4B, the first and second bodies 200 and 205 shown in FIG. 4A return to the closed position and the projector body 227 also return to an original position.

Therefore, if the mobile terminal is carried by a user, a size of the mobile terminal is minimized to facilitate the user to carry the mobile terminal.

And, in order for the projector body 227 not to interfere with the sliding motion between the first and second bodies 200 and 205, a rotation angle of the projector body 227 can be limited to enable the first body 200 to rotate in an upper direction of the first body 200 only.

The above-described projector module is applicable to the bar type mobile terminal as well. This is explained with reference to FIG. 5A and FIG. 5B as follows.

Figure 5A:
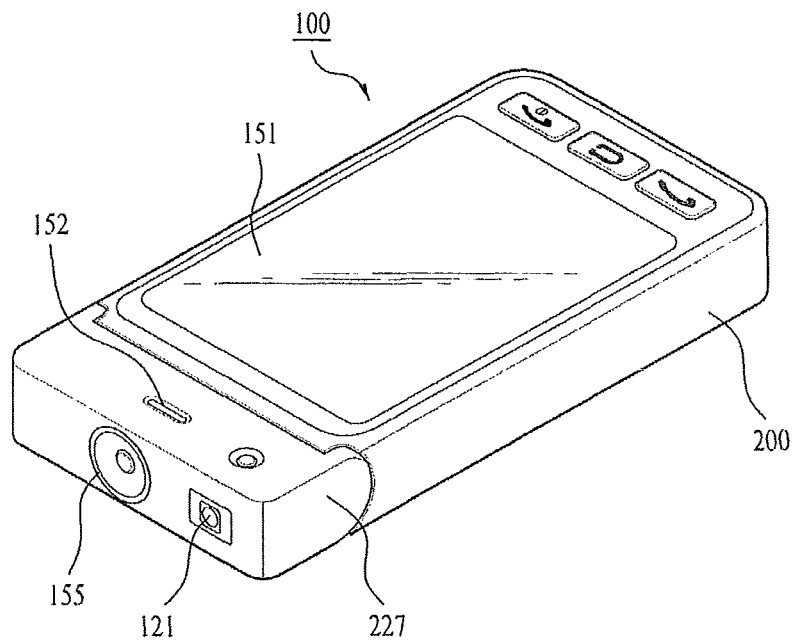
FIG. 5A and FIG. 5B are perspective diagrams for a mobile terminal according to a further embodiment of the present invention.
Figure 5B:
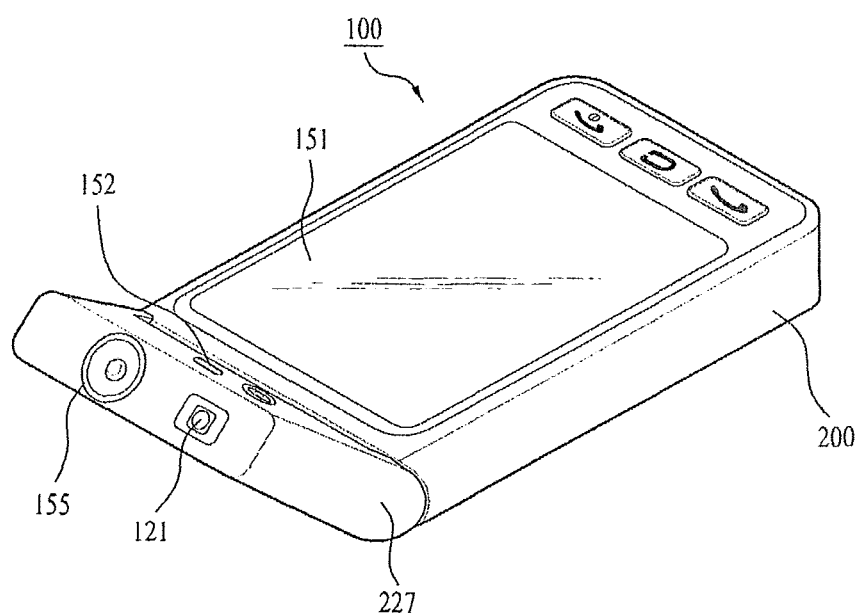

FIG. 5A and FIG. 5B are perspective diagrams of a mobile terminal according to a further embodiment of the present invention.

Referring to FIG. 5A and FIG. 5B, a projector body 227 provided with the aforesaid projector module can be rotatably assembled to a main body 200 of the mobile terminal.

In particular, as mentioned in the above description, the projector body 227 can be hinged to the main body 200. And, it is able to adjust a projection angle of the projector body 227 in case of projecting a picture or image using the projector 155 provided to the projector body 227. And, a camera 121 can be provided to the projector body 227 to photograph the image or picture projected by the projector 155.

FIG. 5A shows a configuration before the projector body 227 rotatably assembled to the main body 227 is rotated. And, FIG. 5B shows a configuration after the projector body 227 has been rotated.

The mobile terminal 100 of FIGS. 1-5B may be configured to operate within a communication system which transmits data via frames or packets, including both wireless and wired communication systems, and satellite-based communication systems. Such communication systems utilize different air interfaces and/or physical layers.

Examples of air interfaces utilized by the communication systems include example, frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 6:
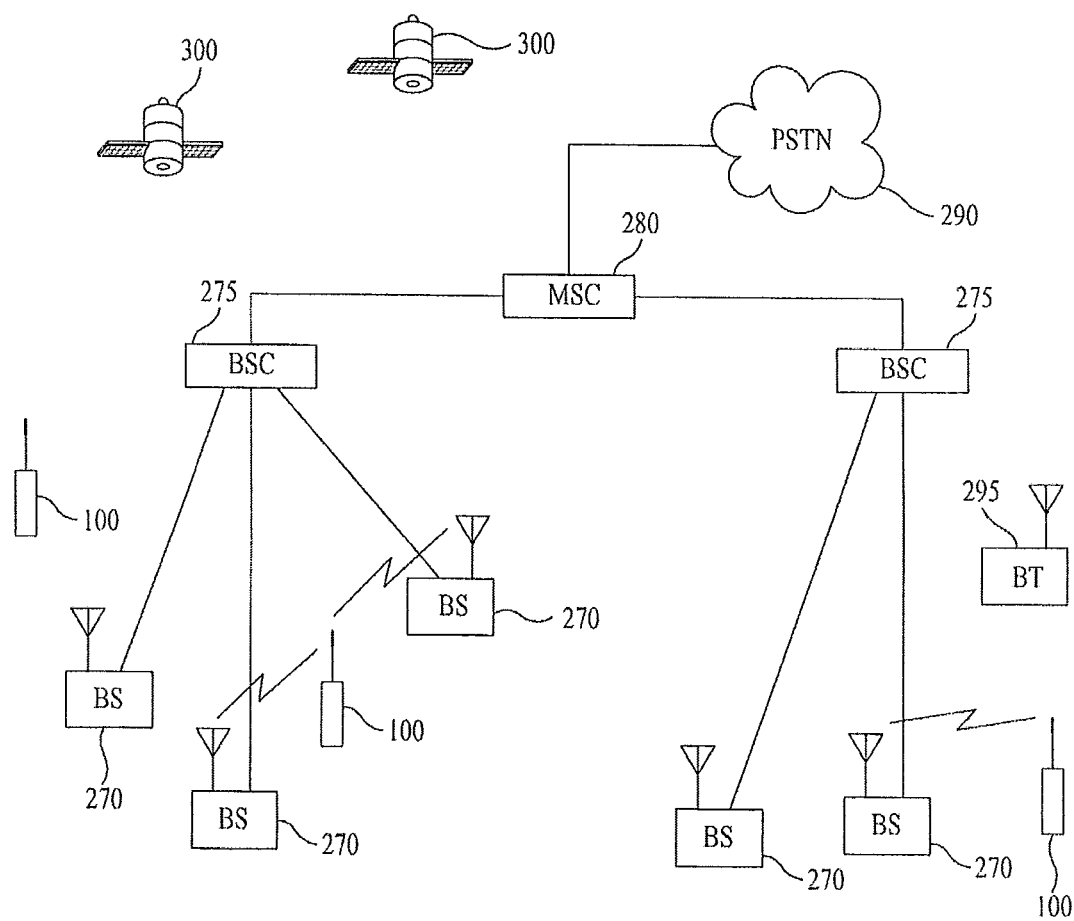
FIG. 6 is a block diagram for an example of a wireless communication system for a mobile terminal according to the present invention to operate therein.

Referring to FIG. 6, a CDMA wireless communication system is shown having a plurality of mobile terminals 100, a plurality of base stations 270, a plurality of base station controllers (BSCs) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 6 further depicts several global positioning system (GPS) satellites 300. Such satellites facilitate locating the position of some or all of the mobile terminals 100. Two satellites are depicted, but it is understood that useful positioning information may be obtained with greater or fewer satellites.

The position-location module 115 (FIG. 1) of the mobile terminal 100 is typically configured to cooperate with the satellites 300 to obtain desired position information. It is to be appreciated that other types of position detection technology, such as location technology that may be used in addition to or instead of GPS location technology, may alternatively be implemented. Some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, and other communications.

Each reverse-link signal received by a given base station 270 is processed within that base station 270. The resulting data is forwarded to an associated BSC 275.

The BSC 275 provides call resource allocation and mobility management functionality including soft handoffs between the base stations 270. The BSCs 275 also route the received data to the MSC 280, which provides additional routing services for interfacing with the PSTN 290.

Similarly, the PSTN interfaces with the MSC 280, and the MSC 280 interfaces with the BSCs 275. The BSCs 275 control the base stations 270 to transmit sets of forward-link signals to the mobile terminals 100.

In the following description, a control method applicable to the above-configured mobile terminal 100 is explained with respect to various embodiments. It is understood that the following embodiments can be implemented independently or through combinations thereof.

First Embodiment

A method of controlling a mobile terminal according to a first embodiment of the present invention is explained with reference to FIGS. 7 to 10 as follows.

Figure 7:
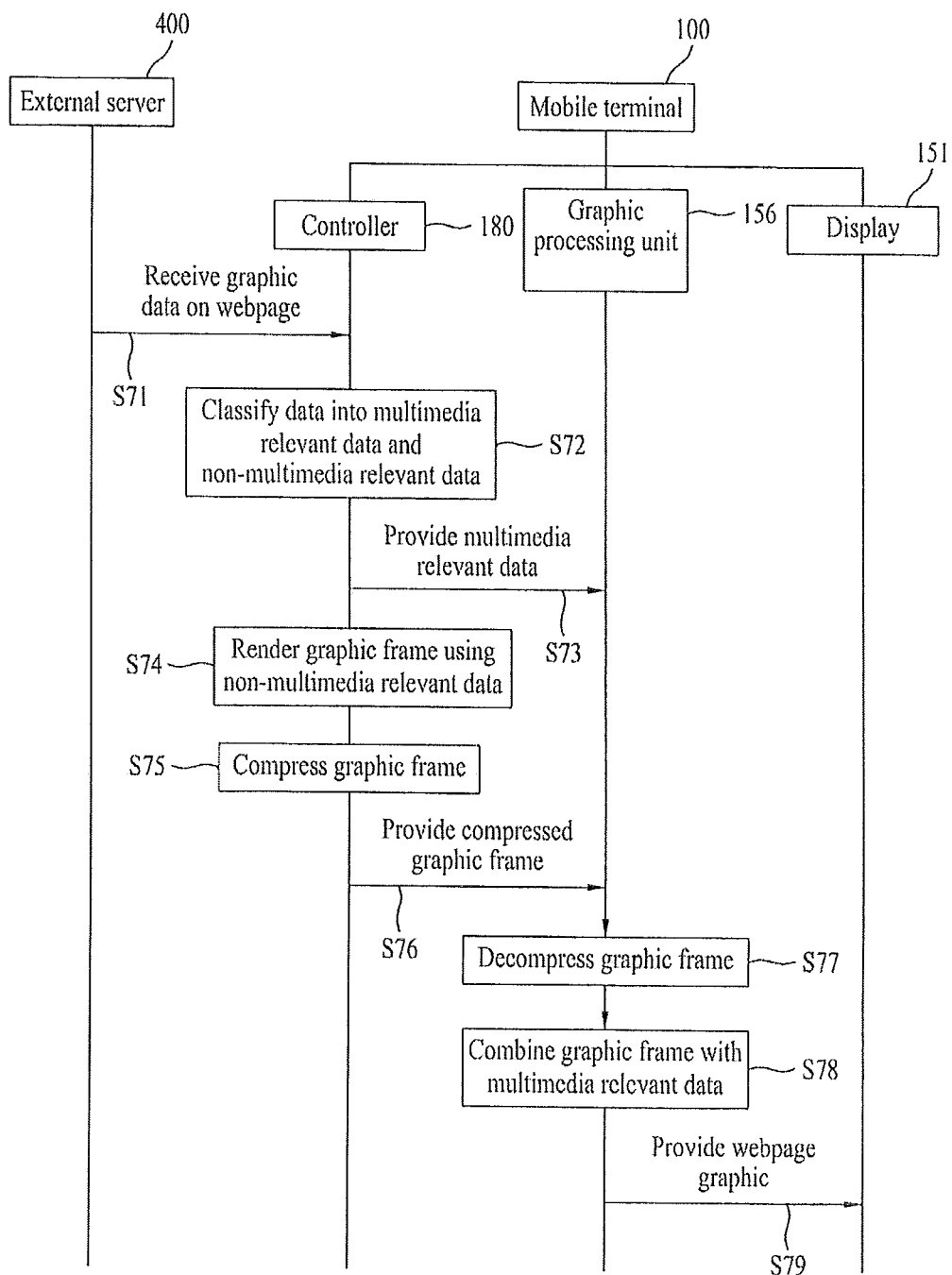
FIG. 7 is a flowchart for a method of controlling a mobile terminal according to a first embodiment of the present invention.
Figure 8:
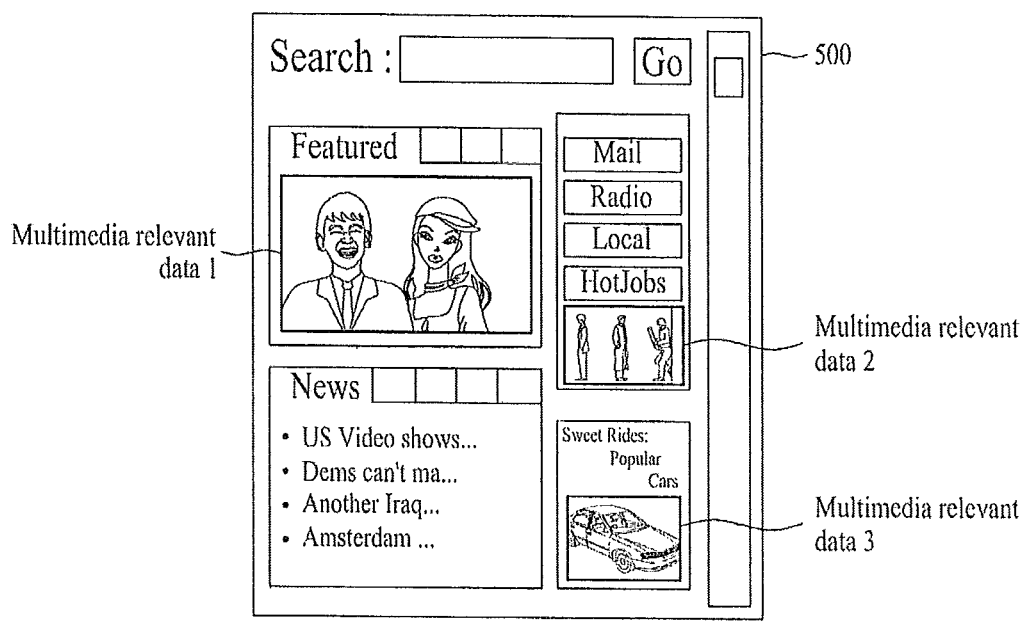
FIG. 8 is an exemplary graphic diagram of a webpage provided from an external server in a method of controlling a mobile terminal according to a first embodiment of the present invention.
Figure 9A:
FIG. 9A is an exemplary diagram of multimedia relevant data of the webpage graphic shown in FIG. 8.
Figure 9A:
Figure 9A:
Figure 9B:
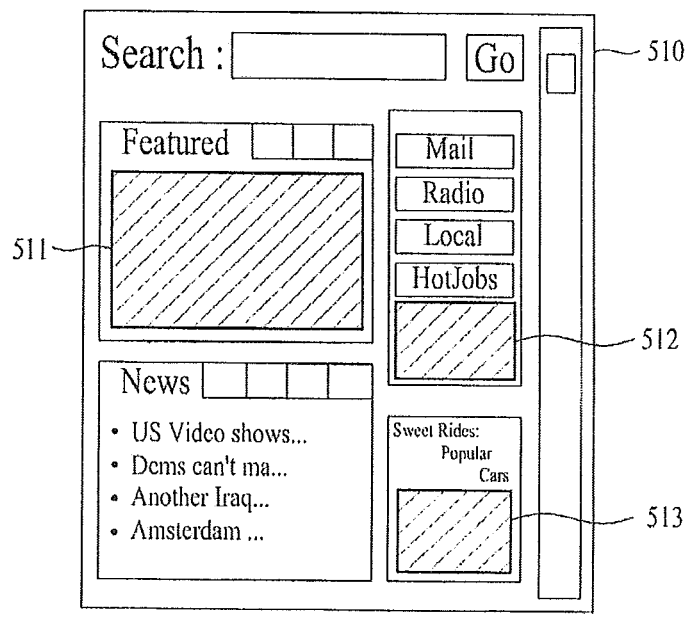
FIG. 9B is an exemplary diagram of a graphic frame for the webpage shown in FIG. 8.
Figure 10:
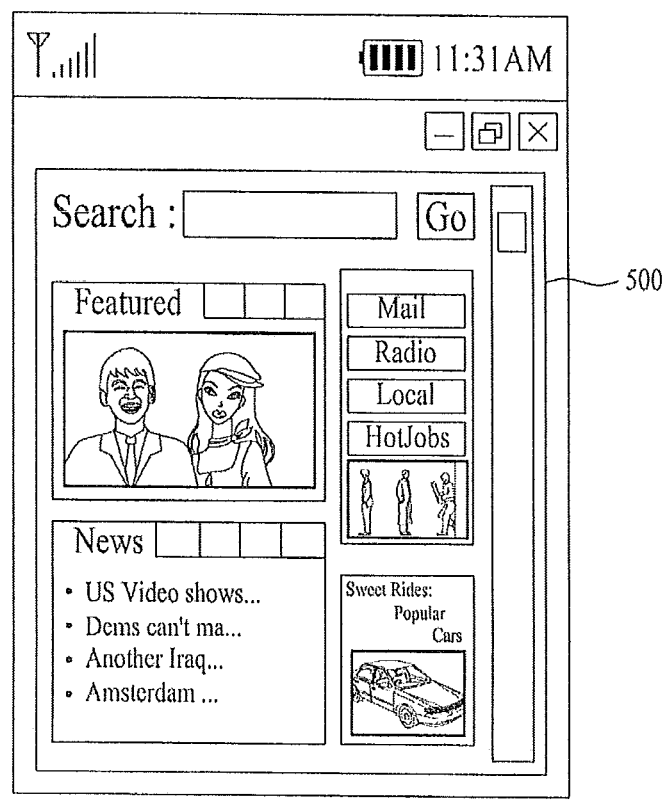
FIG. 10 is a diagram of a graphic displayed on the mobile terminal by a method of controlling a mobile terminal according to a first embodiment of the present invention.

FIG. 7 is a flowchart for a method of controlling a mobile terminal according to a first embodiment of the present invention, FIG. 8 is an exemplary graphic diagram of a webpage provided from an external server in a method of controlling a mobile terminal according to a first embodiment of the present invention, FIG. 9A is an exemplary diagram of multimedia relevant data of the webpage graphic shown in FIG. 8, FIG. 9B is an exemplary diagram of a graphic frame for the webpage shown in FIG. 8, and FIG. 10 is a diagram of a graphic displayed on the mobile terminal by a method of controlling a mobile terminal according to a first embodiment of the present invention.

Referring to FIG. 7, the mobile terminal 100 accesses an external server 400 via the wireless communication unit 110. Subsequently, the controller 180 of the mobile terminal 100 receives graphic data relevant to a webpage provided by the external server 400 via the wireless communication unit 110 [S71].

In this case, the graphic data can include web configuration language data for configuring the webpage, text data included in the webpage, and multimedia relevant data which is relevant to such multimedia included in the webpage as a moving picture and a still picture.

And, the web configuration language can include HTML (hypertext markup language), XML (extensible markup language) or the like.

In the following description, for clarity and convenience of explanation, the web configuration language data and the text data shall be named 'non-multimedia relevant data'.

Graphics on the webpage provided by the external server 400 are explained with reference to FIG. 8 as follows.

First of all, the graphic 500 is constructed with text and multimedia data which are combined with each other by the rule according to the web configuration language data. In FIG. 8, exemplarily shown is that three multimedia relevant data (i.e., multimedia relevant data 1, multimedia relevant data 2 and multimedia relevant data 3) are included in the graphic 500.

Meanwhile, the controller 180 classifies the graphic data into multimedia relevant data and non-multimedia relevant data [S72].

Subsequently, referring to FIG. 9A, the controller 180 does not separately process the classified multimedia relevant data but directly sends it to the graphic processing unit 156 [S73].

Meanwhile, referring to FIG. 9B, the controller 180 renders a graphic frame 510, which is to be transferred to the graphic processing unit 156, using the non-multimedia relevant data [S74].

In this case, regions 511, 512 and 513, as shown in FIG. 9B, are emptied in the rendered graphic frame 510 to be filled with the multi-media relevant data.

It is able to configure the emptied regions 511, 512 and 513 to be represented as specific color. Therefore, the multimedia relevant data will be facilitated to fill the emptied regions 511, 512 and 513.

Subsequently, the controller 180 compresses the rendered graphic frame 510 and then provides the compressed graphic frame to the graphic processing unit 156 [S75, S76]. If necessary, the controller 180 is able to provide the graphic frame 510 with information on the multimedia relevant data so that each of the empty regions of the graphic frame 10 can be properly filled with the multimedia relevant data.

Optionally, the step S73 and the steps S74 to S76 can be performed simultaneously or in reverse order.

If so, the graphic processing unit 156 decompresses the compressed graphic frame 510 [S77].

Subsequently, the graphic processing unit 156 completes a graphic of a webpage provided by the external server 500 by combining the decompressed graphic frame and the multimedia relevant data with each other [S78].

And, the graphic processing unit 156 provides the completed graphic to the display unit 151, whereby the completed graphic, as shown in FIG. 10, can be displayed on the display unit 151 [S79].

Meanwhile, the graphic processing unit 156 is able to provide the completed graphic to the projector module 155 if necessary. In this case, the completed graphic can be projected on an external screen (not shown in the drawings) via the projector module 155.

Second Embodiment

A method of controlling a mobile terminal according to a second embodiment of the present invention is explained with reference to FIG. 11 and FIG. 12 as follows.

Figure 11:
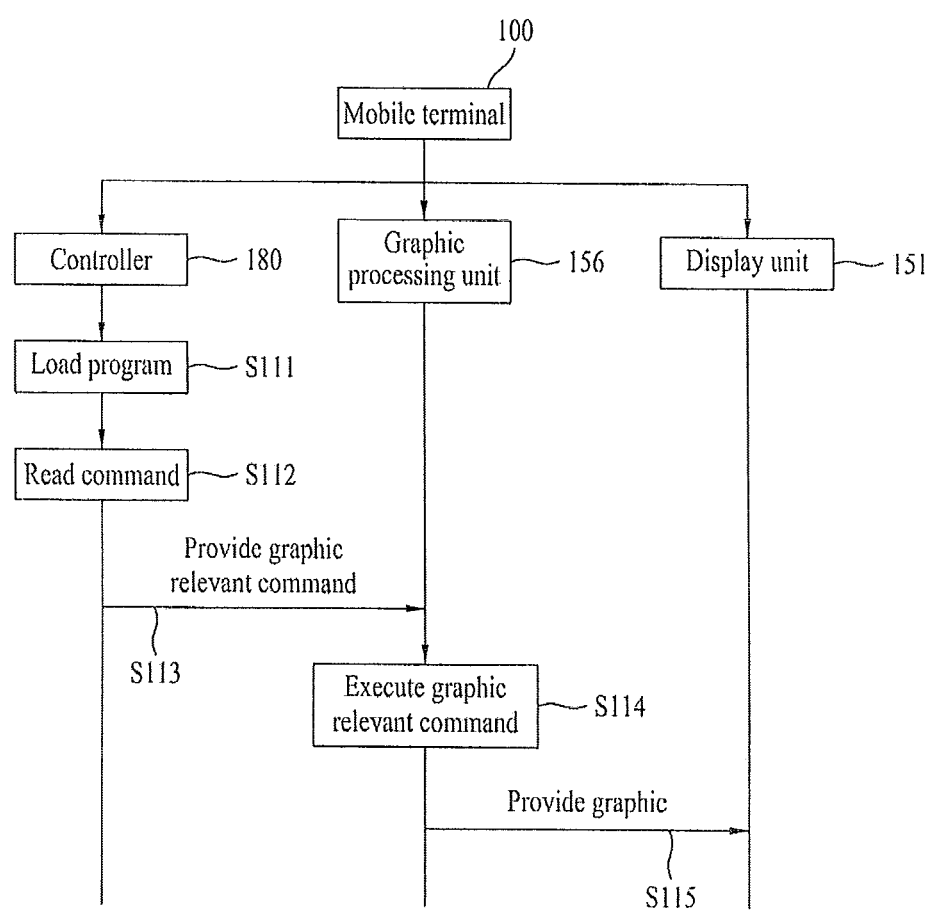
FIG. 11 is a flowchart for a method of controlling a mobile terminal according to a second embodiment of the present invention.

FIG. 11 is a flowchart for a method of controlling a mobile terminal according to a second embodiment of the present invention and FIG. 12 is a diagram for an example of a source code of a program programmed by Java-based language.

Referring to FIG. 11, the controller 180 loads a prescribed program [S111]. In this case, the program can be programmed with any kind of programming language if executable in the mobile terminal 100. For instance, the program can be programmed with Java based language (e.g., Java Script, etc.) or C based language (e.g., C++).

In case that the program is programmed with the Java based language, the program can be called a Java application, a Java applet, a Java midlet or the like. Alternatively, if the program is programmed with the C based language, the program can be named an application program.

The following description continues on the assumption that the program is the Java midlet.

If the Java midlet is stored in the memory 160, the controller 180 is able to load the Java midlet from the memory 160. Alternatively, if the Java midlet is stored in the external server, the controller 180 accesses the external server via the wireless communication unit 110 and is then able to load the Java midlet from the external server.

Subsequently, the controller 180 reads commands from the source code of the Java midlet shown in FIG. 12 [S112].

The controller 160 directly executes the command which is not related to the graphic among the read commands.

Yet, the controller 180 provides the command related to the graphic among the read commands to the graphic control unit 156 [S113]. In FIG. 12, the commands related to the graphic are indicated by boxes.

The graphic control unit 156 executes the command related to the graphic [S114].

Subsequently, the graphic processing unit 156 displays a prescribed graphic related to the midlet on the display unit 151 [S115].

As mentioned in the foregoing description, the graphic processing unit 156 provides the prescribed graphic to the projector module 155 if necessary. Hence, the prescribed graphic can be projected on an external screen (not shown in the drawings) via the projector module 155.

Accordingly, the present invention provides the following effect and/or advantage.

First of all, according to at least one of embodiments of the present invention, since a large-scale graphic data is processed in a manner of being appropriately distributed to a controller and a graphic processing unit of a terminal, an execution speed of the terminal can be enhanced.

It will be apparent to those skilled in the dart that the present invention can be specified into other forms without departing from the spirit or scope of the inventions.

For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a display unit;
   a wireless communication unit configured to receive graphic data of a webpage from a website via an internet access;
   a graphic processing unit configured for graphic processing; and
   a control unit configured to:
   classify the received graphic data of the webpage into multimedia relevant data and non-multimedia relevant data, wherein the multimedia relevant data comprises at least one of moving picture data and still picture data and non-multimedia relevant data comprises web configuration language data and text data,
   transfer the classified multimedia relevant data in the graphic data to the graphic processing unit without compressing the multimedia relevant data,
   render a graphic frame using the classified non-multimedia relevant data in the graphic data such that the rendered graphic frame has a same number of empty regions as the multimedia relevant data, and
   compress the rendered graphic frame and transfer the compressed graphic frame to the graphic processing unit,
   wherein the control unit controls the graphic processing unit to decompress the compressed graphic frame and combine the multimedia relevant data with the decompressed graphic frame to display on the display unit such that each of the multimedia relevant data occupies its corresponding empty region of the decompressed graphic frame, and
   wherein the empty regions are filled with a specific color and then compressed.

2. The mobile terminal of claim 1, wherein the web configuration language data includes HTML (hypertext markup language) and XML (extensible markup language).

3. A method of controlling a mobile terminal including a control circuit, a wireless communication circuit, a graphic processing circuit, and a display unit, the method comprising:
   enabling, by the control circuit, the wireless communication circuit to receive graphic data of a webpage from a website via an internet access;
   classifying the received graphic data of the webpage into multimedia relevant data and non-multimedia relevant data, wherein the multimedia relevant data comprises at least one of moving picture data and still picture data and non-multimedia relevant data comprises web configuration language data and text data;
   providing, by the control circuit, the multimedia relevant data in the graphic data to the graphic processing circuit without compressing the multimedia relevant data;
   rendering, by the control circuit, a graphic frame using the classified non-multimedia relevant data in the graphic data such that the rendered graphic frame has the same number of empty regions as the multimedia relevant data;
   compressing, by the control circuit, the rendered graphic frame and providing the compressed graphic frame to the graphic processing circuit;
   enabling, by the control circuit, the graphic processing circuit to decompress the compressed graphic frame and combine the multimedia relevant data with the decompressed graphic frame together such that each of the multimedia relevant data occupies its corresponding empty region of the decompressed graphic frame; and
   displaying, by the control circuit, the combined data and frame on the display unit,
   wherein the empty regions are filled with a specific color and then compressed.

* * * * *